UNITED STATES PATENT OFFICE.

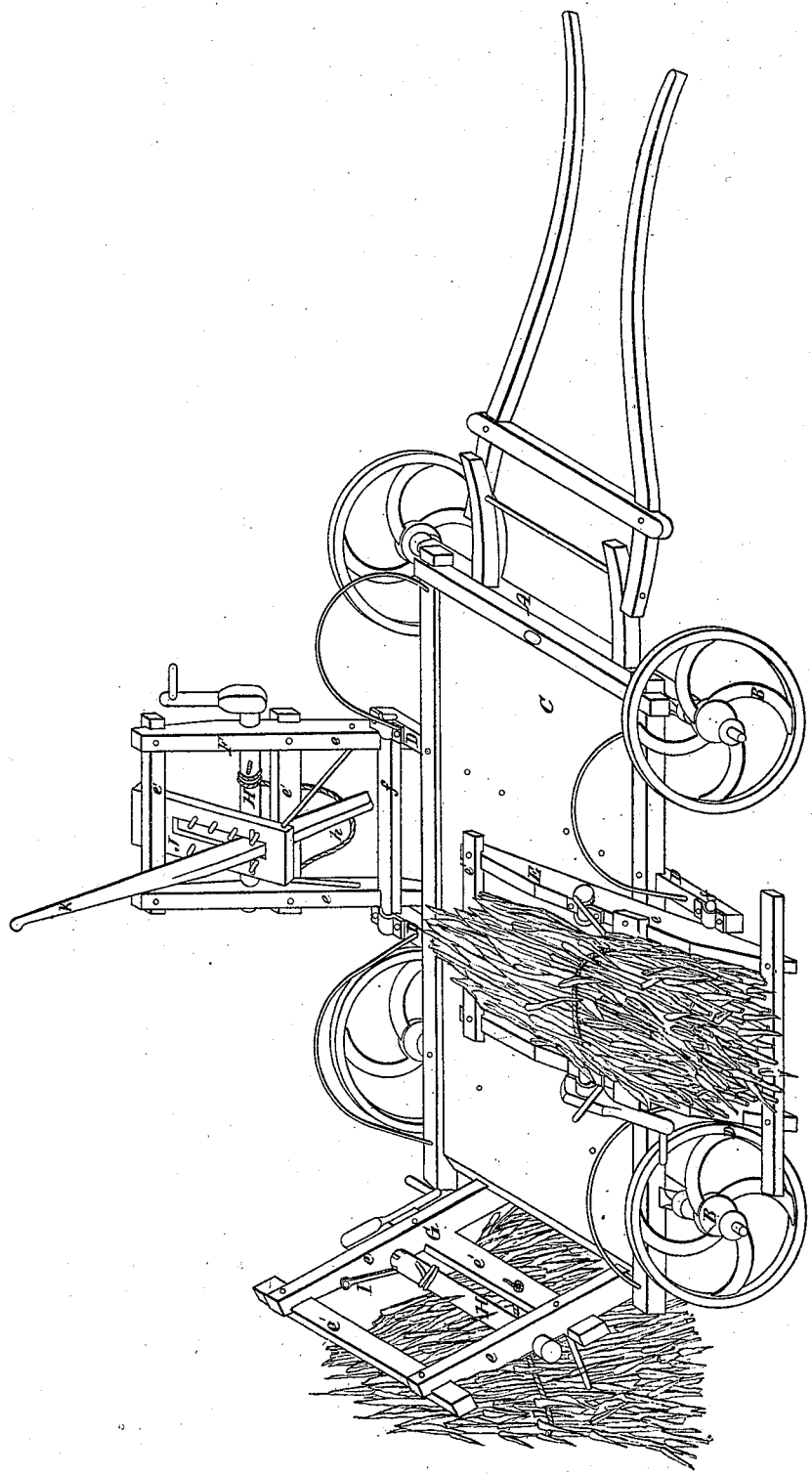

WILLIAM M. MASON, OF POLO, ILLINOIS.

DEVICE FOR LOADING AND UNLOADING CORN-SHOCKS.

Specification forming part of Letters Patent No. 42,008, dated March 22, 1864.

*To all whom it may concern:*

Be it known that I, WILLIAM M. MASON, of Polo, in the county of Ogle and State of Illinois, have invented a certain new and useful Method of Loading, Transporting, and Unloading Shocks of Corn, Hay, or other Crops, of which the following is a full, clear, and exact description, reference being had to the accompanying drawing, which makes part of this specification, and which represents a view in perspective of a machine embracing my improvement.

It is the object of my invention to load shocks of grain, as they stand in the field, upon a carriage, to transport simultaneously a number of them, and to deliver them wherever desired in a standing position without handling; to which end the improvement herein claimed consists in attaching a number of tilting frames (each of which is capable of lifting, supporting, and delivering a single shock) to a horizontal wagon bed or bottom.

In order to carry out the object of my invention, I construct and mount upon a suitable carriage a strong frame, having side pieces, each heavy enough to support a tilting frame loaded with a shock, and of a length sufficient to carry the tilting frame and its load in front of the wheels where but two are used, or between the wheels when four are employed, to transport the load, and to project far enough behind the axle of the rear wheels to support an additional tilting frame.

In the accompanying drawing, which represents a convenient arrangement of parts for carrying out the object of my invention, a suitable carriage, A, is represented as mounted on four wheels, B. A stout frame or bed, C, rests upon this carriage. The side and cross pieces of this frame are strong enough to support the tilting frames. Two of the cross-braces, D, project beyond each side of the frame and the ends of the axles in order to support a tilting frame, E F, while a similar frame, G, is pivoted to the projecting rear ends of the side pieces, c, of the frame behind the hind wheels.

The tilting frames are constructed of side pieces, e, and cross-pieces e' are supported on axles f, and carry a cord and windlass, H, controlled by a pawl and ratchet, I. The axle f may constitute one of the cross-braces and project at each end beyond the side pieces of the frame far enough to carry journals, which may rest upon the projecting ends of the bed-frame or cross-braces D, and can be there secured by straps or bolsters.

These tilting frames must be so pivoted to their several axles as to vibrate freely in a vertical plane without their lower or outer ends touching the ground, and may carry a graduated slotted rack, J, attached to their upper or inner ends, to furnish a fulcrum for a hand-lever, K, to aid the attendant to tilt the frame over on the head when loading the shock or to tilt it up into a vertical position when the shocks are to be unloaded.

It is obvious that this arrangement of tilting frames upon a wagon-bed enables me to load and unload the crop with great economy of manual labor, for it is only necessary to drive the wagon to such a position as will permit a shock to be securely attached to one of the tilting frames by the cord or chain *h* and drawn tightly upon it by the windlass H, where it is securely held by the pawl and ratchet I. The lever K is now inserted into the graduated rack J, and the frame, with the shock attached, is drawn over on the bed-frame C of the wagon, which, when each of the tilting frames receives a shock, constitutes a load which can be transported to any desired place of storage, when the frames are again tilted into an upright position by means of the lever and the cord or chain removed from the shock, which again resumes its standing position, having undergone in the removal much less breaking or shaking than if it had been loaded and unloaded by hand.

What I claim as my invention, and desire to secure by Letters Patent of the United States, is—

The combination of two or more tilting frames with the horizontal bed-frame of a cart or wagon, when constructed and arranged substantially in the manner described, for the purposes set forth.

In testimony whereof I have hereunto subscribed my name.

WM. M. MASON.

Witnesses:
    EDM. F. BROWN,
    WM. D. BALDWIN.